April 15, 1958  F. G. VAN DE WATER  2,830,502
SWARF CUTTING MILLING MACHINE
Filed Feb. 20, 1956  4 Sheets-Sheet 1

FRANK VAN DE WATER,
INVENTOR.

BY
William P. Green
ATTORNEY.

April 15, 1958 F. G. VAN DE WATER 2,830,502
SWARF CUTTING MILLING MACHINE
Filed Feb. 20, 1956 4 Sheets-Sheet 4

FRANK VAN DE WATER,
INVENTOR.

BY William P. Green
ATTORNEY.

United States Patent Office 2,830,502
Patented Apr. 15, 1958

2,830,502

SWARF CUTTING MILLING MACHINE

Frank G. Van De Water, Manhattan Beach, Calif., assignor to Glide Easy Furniture Company, Hawthorne, Calif., a corporation of California Application February 20, 1956, Serial No. 566,537

10 Claims. (Cl. 90—13)

This invention relates to improved milling machines of a type particularly adapted for making "swarf" cuts, such as are often required in the manufacture of various aircraft parts.

A swarf cut is one in which the milling cutter progressively varies its angularity with respect to the work during a cutting operation, to form a surface whose angularity varies correspondingly. Heretofore, the equipment utilized for making such cuts has been extremely limited as to the variations in cut which could be made, and has also been very difficult to set up for a particular swarf cutting operation. The general object of the present invention is to provide an improved machine which is especially designed for much greater versatility in the making of swarf cuts, and which can be set up with much greater ease than prior similar machines. Particularly contemplated is a machine which can swarf about an axis which is non-linear, that is, an axis or ("mold point") which moves transversely of the work as the cut progresses.

A machine embodying the invention includes a pair of sections one of which holds the work piece, and the other of which carries the rotary power driven cutter. One of these sections, preferably the work holder, moves relative to the other along a predetermined path to make the cut. As the sections are thus relatively moved, the cutter holding unit swings progressively about the swarf axis, which is normal to the direction of the path of relative movement.

The versatility of the apparatus is gained in large part by a unique manner of mounting the cutting unit for its swinging movement. In particular, the unit is attached to a mounting element for pivotal movement about a second axis which is offset from the swarf axis, and this mounting element and the pivotal connection are in turn mounted for bodily swinging movement about the swarf axis, preferably by a unique parallelogram type of linkage. As the mounting element thus swings, the cutting unit may be actuated pivotally relative to the mounting element, to maintain the cutting unit in proper relation to the swarf axis.

In addition to the above movements, the cutting unit may be mounted for actuation axially of the cutter, to further vary the cut, or to retract the cutter to an inactive position. Also, the entire cutter mounting linkage may be bodily shiftable transversely of the swarf axis to allow formation of a cut about a non-linear axis. Preferably, all of these various movements of the mechanisms are controlled by suitable cams, which may be easily replaced to vary the cut being made by the machine.

The above and other features and objects of the present invention will be better understood from the following detailed description of the typical embodiment illustrated in the accompanying drawings in which:

Fig. 7 is an enlarged fragmentary perspective view of a portion of the rotary cutter and motor mounting structure, Fig. 8 is a schematic representation of the hydraulic and pneumatic control systems of the apparatus, and Fig. 9 represents fragmentarily a slightly variational form of the invention.

Figure 1:
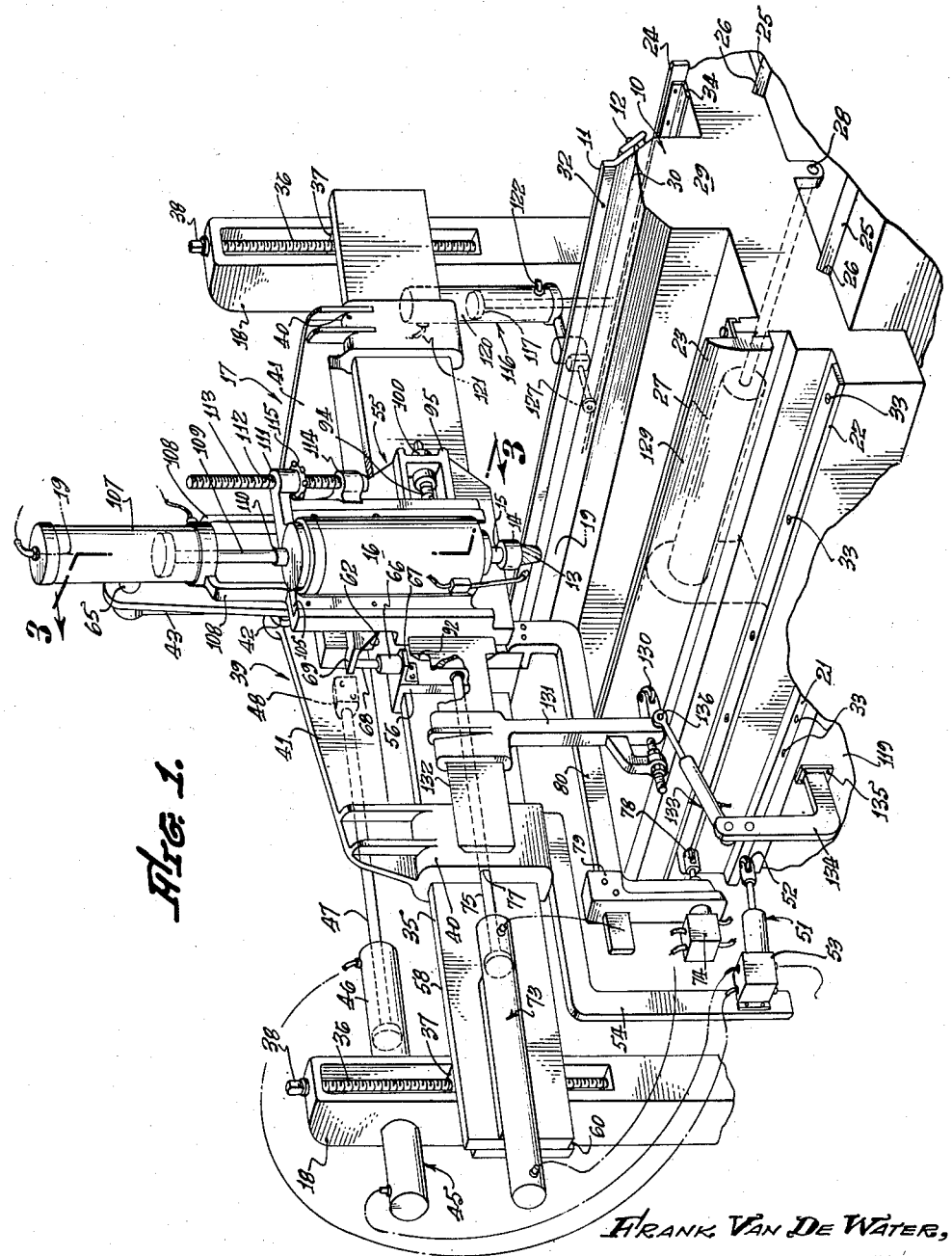
Fig. 1 is a perspective view of a swarf cutting milling machine constructed in accordance with the invention.
Figure 2:
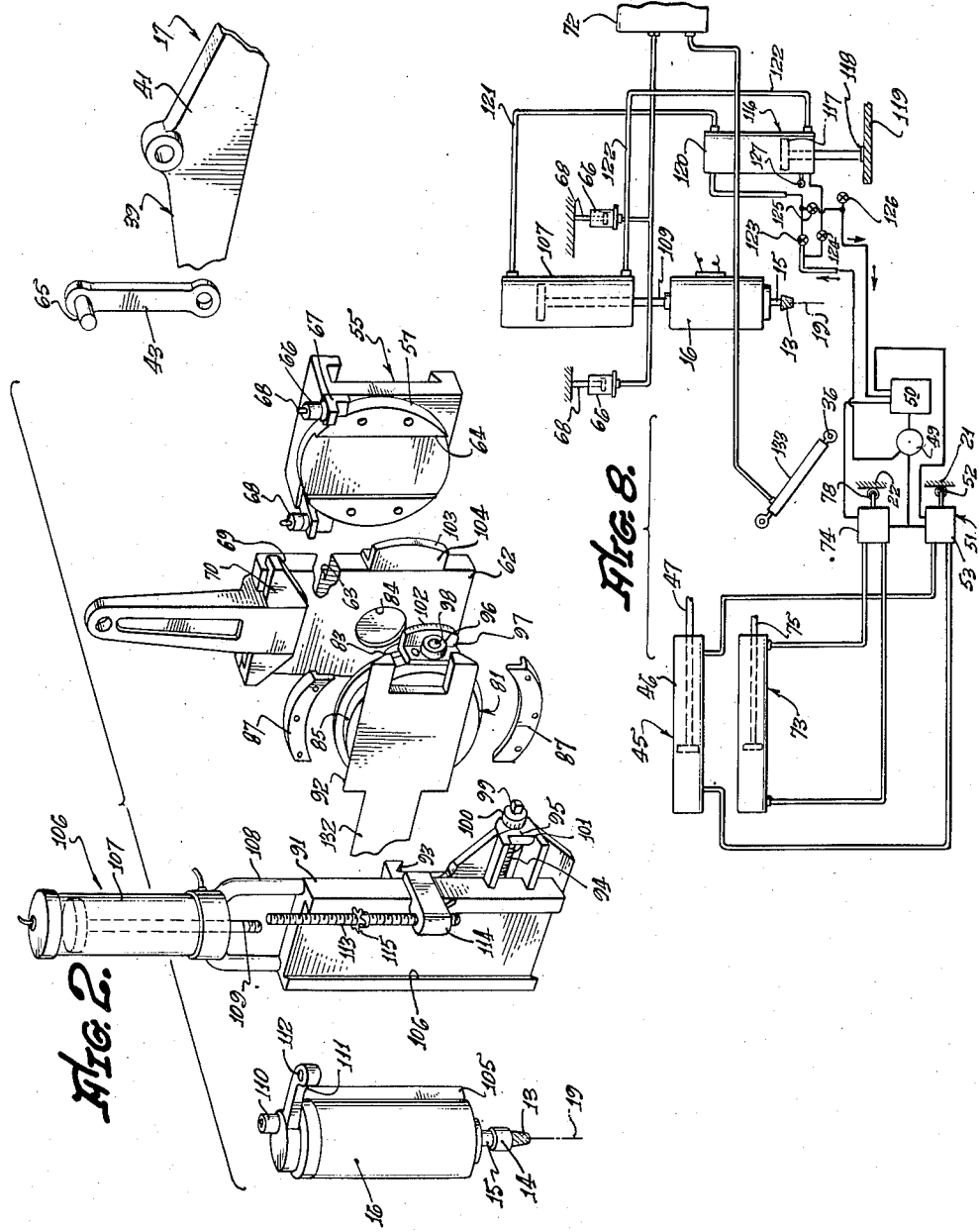
Fig. 2 is a fragmentary exploded perspective view of certain of the cutter mounting parts of the Fig. 1 machine.

Referring first to Fig. 1, the illustrated swarf cutting milling machine includes a horizontally reciprocable carriage or table structure 10, to which a work piece 11 is removably mounted, as by suitable clamps or fastening means represented typically at 12. The work piece 11 is machined or cut by a conventional rotary milling cutter, which is removably mounted in a chuck 14 carried and driven by the rotary shaft 15 of an electric motor 16. The motor 16 and cutter 13 are portions of a head structure generally represented at 17 which is mounted to a pair of stationary support members 18 projecting upwardly from the floor at opposite sides of the machine. Motor 16 and cutter 13 rotate about a common axis 19, and are mounted to bodily swing about an axis 20 extending parallel to the direction of movement of carriage 10. The mounting of the motor and cutter for such swinging movement is effected by an essentially parallelogram type mounting arrangement, including the parts shown in exploded perspective in Fig. 2, which parts will be discussed in greater detail at a later point. The movements of the motor and cutter are controlled by four elongated cams 21, 22, 23 and 24, which actuate the motor mounting parts.

With more specific reference now to the manner of construction of work supporting table 10, this table or carriage is typically represented as being mounted for horizontal reciprocable movement, by means of a pair of parallel horizontal stationary support rails 25, which are received within correspondingly shaped guide grooves or tracks 26 formed in the undersurface of table 10. The table 10 is actuatable in opposite directions along rails 25 by means of a hydraulic piston and cylinder mechanism 27 which may be positioned beneath the table, with the cylinder of this mechanism being stationarily attached to the floor, and the piston rod being rigidly attached to an end portion of the table at 28. The table may have a central longitudinally extending upwardly projecting portion 29 having various different faces 30 to which different shaped work pieces 11 may be attached in any conventional manner. In the case of the particular elongated metal work piece 11 shown in Fig. 1, it is desired to form a swarf cut on the side 32 of the upwardly projecting portion of that work piece. All of the four control cams 21, 22, 23 and 24 are elongated in the direction of movement of carriage 10, and are properly contoured to effect the desired movements of motor 16 and cutter 13 as table 10 moves work piece 11 horizontally past the rapidly rotating milling cutter 13. The cams 21 through 24 are specially designed for each swarf cutting operation that is to be performed, and are removably attached to table 10 at the illustrated locations by screws 33 extending through openings in the cams and connecting into threaded openings in table 10 (or in the case of cam 13, threaded openings in an angular bracket 34 attached to table 10.)

The two stationary support columns 18 at opposite sides of the machine adjustably mount a main transverse rail 35, which extends directly transversely of the direction of movement of table 10 along rails 25, and which extends across the upper side of table 10. Rail 35 lies essentially in a vertical plane, and is attached to support members 18 by a pair of vertical screws 36 contained within these hollow support members 18. Each of the screws 36 is suitably mounted in the corresponding support member 18 for rotary adjustment, while being effectively retained against any axial or vertical displacement relative to the support member. A pair of vertically spaced nut members 37 are carried about each of the screws 36, and are attached to rail 35 at vertically spaced locations, so that rotation of screws 36 acts to vertically adjust nuts 37 and the rigidly carried rail 35. Such rotation of the screws is produced by means of a suitable wrench acting against the upwardly projecting polygonal actuating ends 38 of the screws. In use, screws 36 are adjusted to positions in which the longitudinal axis of guide rail 35 extends directly horizontally, so that the parts which are mounted on that rail are movable directly horizontally in a plane which is disposed directly transversely of the swarf axis 20 and the direction of movement of table 10 along the rails 25.

The various cutter mounting parts are carried by a yoke or carriage 39 which is mounted for sliding movement horizontally along rail 35. This yoke 39 has two spaced saddle portions 40 at its opposite ends, which are internally shaped in correspondence with the cross-sectional configuration of rail 35, to slidably guide yoke 39 for its desired movement longitudinally along rail 35. The two saddle portions 40 of yoke 39 are interconnected rigidly by an upper portion 41 of the yoke, which carries at a central location a pin 42 which pivotally mounts an upwardly projecting link 43 for swinging movement about an axis 44 extending parallel to the direction of movement of table 10.

As will appear at a later point, the positioning of axis 44 determines the positioning of the swarf axis 20 about which motor 16 and cutter 13 swing, the swarf axis 20 being parallel to and spaced a predetermined distance directly beneath axis 44 of link 43. Consequently, shifting movement of saddle 39 along rail 35 during a swarf cutting operation acts to laterally shift the swarf axis relative to work piece 11. Such shifting of yoke 39 is produced by a hydraulically operated piston and cylinder mechanism 45, whose horizontal cylinder 46 is rigidly attached to one of the support members 18, and whose piston rod 47 is rigidly attached at 48 to the rear side of yoke 39. Referring to Fig. 8, cylinder 45 is supplied with pressurized hydraulic fluid from a pump 49 drawing from a reservoir 50, with the supply of pressurized fluid to cylinder 45 being controlled by a conventional close tolerance cam follower type valve 51 whose axially movable follower element 52 engages and follows the previously mentioned control cam 21. Actuating element 52 of valve 51 is axially movable relative to body 53 of the valve through a very limited range of movement, and responds to very slight movement (say about .002 of an inch) in a manner allowing pressure fluid from pump 49 to pass to one of the ends of cylinder 45 in a manner actuating yoke 39 in the same horizontal direction that valve control element 52 has been moved. The body 53 of valve unit 51 is rigidly connected to an arm 54 which projects downwardly from and is movable with yoke 39. As a result, valve 51 and piston and cylinder mechanism 45 act together to shift yoke 39 laterally along rail 35 in accordance with horizontal displacement or shifting of the surace of cam 21 which is engageable by follower 52. That is, any displacement of element 52 by cam 21 as table 10 moves causes element 52 to shift axially relative to valve body 53 in a manner such that the valve element causes fluid to flow from pump 49 to cylinder 45 to shift yoke 39 in correspondence with the displacement of element 52. By virtue of the rigid connection of the valve unit 51 to the yoke through arm 54, the yoke is caused to accurately follow all displacements of elements 52 by cam 21. Valve 51 is of course constructed to simultaneously control both the supply of pressure fluid to one end of cylinder 46, and the escape of pressure fluid from the opposite end of the cylinder back to reservoir 50.

Figure 3:
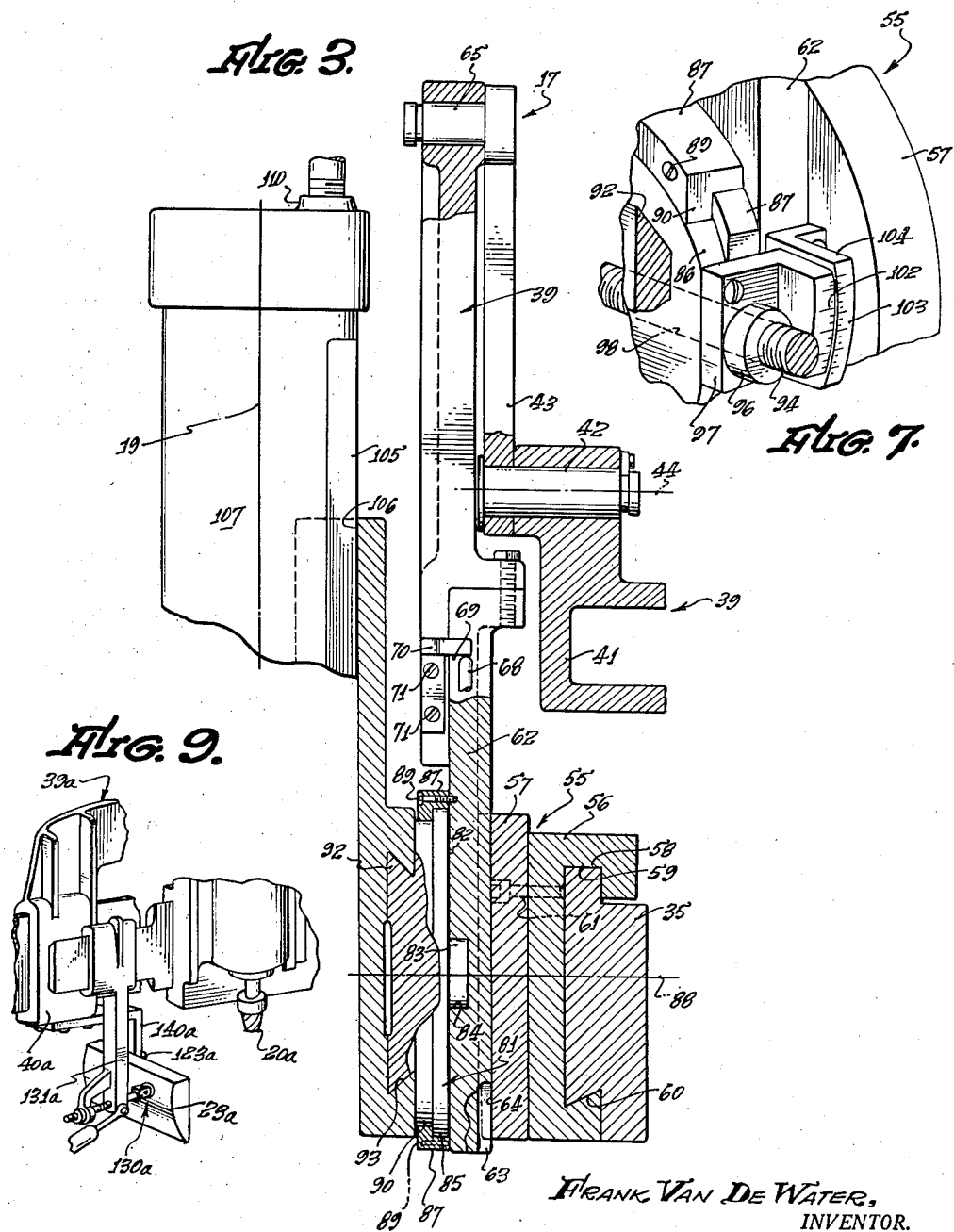
Fig. 3 is a fragmentary enlarged sectional view taken primarily on line 3—3 of Fig. 1.

Between the two saddle portions 40 of yoke 39, there is provide a second slide unit or carriage 55, which is slidable longitudinally of and along rail 35 relative to yoke 39. This intermediate carriage unit 55 may be formed of two parts 56 and 57 (see Fig. 3), the former of which has internally a transverse configuration corresponding to the sectional shape of rail 35. As seen in Fig. 3, the rail may have an upper guiding projection 58 received within an undercut groove 59 in member 56, with both of the parts 35 and 56 being provided with dovetail undercut portions 60 spaced beneath recess 59, so that member 56 is effectively guided for only the desired sliding movement longitudinally of member 35. As will be apparent, the saddle portions 40 of yoke 39 may have the same cross sectional shape internally as is represented in Fig. 3 in connection with member 56.

The second section 57 of carriage unit 55 is rigidly attached to the forward side of member 56 in any suitable manner, as by a number of screws 61. Member 57 may typically be circular (see Fig. 2), and at its forward side movably carries a slide member 62, which is guided for only vertical sliding movement relative to parts 56 and 57. Such guiding of the slide 62 for only vetrical sliding movement is effected by a sliding tongue and groove type connection between the parts, which may include a dovetail type vertically extending projection 63 formed at the rear side of element 62 and slidably confined within an undercut dovetail recess 64 extending vertically across the face of element 57. The dovetail interengagement of parts 57 and 62 of course retains the latter against the face of the former at all times.

At its upper end, part 62 is pivotally attached by a pin 65 to the upper end of the previously mentioned link 43, the pivotal axis of pin 65 being parallel to axis 44 of pin 42, and to the axis of horizontal movement of table 10. By virtue of the interconnection of parts 62 and 39 through link 43, any shifting movement of carriage 55 along rail 35 during a swarf cutting operation acts to control the extent to which motor 16 and cutter 13 are swung about the swarf axis 20. When such lateral shifting of carriage 55 causes the carried part 62 to correspondingly shift laterally, the connection of part 62 to yoke 39 through link 43 causes part 62 to simultaneously move downwardly relative to carriage 55 in accordance with the swinging movement of link 43. The manner in which this causes swinging movement of the cutter and the motor about the swarf axis will be discussed in greater detail at a later point. In order to prevent excessive strain on link 43, the weight of part 62 may be supported primarily from carriage 55 by a pair of pneumatic piston and cylinder mechanisms 66, which are supported on a pair of angular brackets 67 attached to element 57 of carriage 55. The upwardly projecting piston rods 68 of mechanisms 66 bear upwardly against shoulders 69 on a pair of brackets 70 which are rigidly attached to member 62, as by screws 71. Compressed air is supplied to cylinders 66 beneath their pistons from a compressed air source 72 (see Fig. 8), with air being bled from the cylinders above their pistons, so that in all vertical positions of member 62 relative to carriage 55, the major portion of the weight of element 62 is supported by piston and cylinder mechanisms 66 rather than link 43.

The horizontal shifting movement of carriage 55 along rail 35 is effected by a horizontal piston and cylinder mechanism 73 corresponding to previously described mechanism 45, and controlled by a close tolerance follower valve unit 74 corresponding to the previously described valve 51. The cylinder of mechanism 73 is rigidly attached in horizontal condition to one end of rail 35, while the piston rod 75 of this mechanism is rigidly attached at 76 to the actuated carriage 55. Rod 75 may slidably extend through an opening 77 in one of the saddle portions 40 of yoke 39. The follower element 78 of valve unit 74 engages and follows the side of cam 22, which is contoured to control the swinging movement of motor 16 and cutter 13 about swarf axis 20 in accordance with a predetermined desired pattern. The body or housing of cam follower valve unit 74 is rigidly attached to and movable with carriage 55, the connection being effected by means of rigid connecting members 79 and 80.

At its forward side, the vertical slide member 62 rotatably carries a trunnion element 81, which mounts the motor and cutter for pivotal movement relative to member 62. To allow for such pivotal or rotary movement, member 81 has a vertical rear face bearing against the forward vertical face of element 62 and carrying a central cylindrical projection 83 which is rotatably received and confined within a correspondingly dimensioned cylindrical bore 84 formed in element 62. Also, member 81 is provided with two short cylindrical external surfaces 85 and 86 forwardly of element 62, and element 62 carries a pair of arcuate upper and lower flanged bearing members 87 which extend about the flange formed by portion 85 of element 81, so that the engagement of elements 87 with the coacting circular portion of elements 81 cooperates with projection 83 in mounting element 81 for rotary movement about a horizontal axis 88 relative to element 62. Bearing parts 87 may be attached to slide member 62 by a number of screws 89, and by virtue of their inwardly extending flange portions 90, these bearing elements 87 act to positively hold rotary part 81 against the forward face of slide member 62. The axis 88 about which element 81 is rotatably movable extends parallel to the previously mentioned axis 44, and to the direction of horizontal movement of table 10 along rails 25.

To the forward side of trunnion member 81, there is adjustably mounted a motor carrier part 91, which in turn movably carries at its forward side the cutter driving electric motor unit 16. For attaching the parts 81 and 91 together, the former has a forward dovetail or slide portion 92, which is slidably received and confined within a correspondingly shaped undercut groove or recess 93 formed in the rear portion of element 91 (see Figs. 2 and 3). The connection 92-93 mounts element 91 for sliding movement relative to element 81 directly transversely of rotary axis 88 of the latter part. This sliding movement of part 91 is also in a direction which is directly transverse with respect to the rotary axis 19 of motor 16 and cutter 13.

The part 91 is adjusted relative to part 81 by means of an adjusting screw 94, which extends parallel to the direction of sliding movement of part 91, and is journaled by a bearing portion 95 of element 91 for rotation about the axis of the screw. This bearing portion 95 of element 91 allows rotation of screw 94 while preventing any axial movement of that screw. Inwardly of bearing portion 95, motor carrier 91 is cutaway in a manner allowing extension of screw 94 through a coacting threaded nut 96 which is rigidly attached to a part 97, which is in turn rigidly attached to member 81. Inwardly beyond nut 96, parts 97 and 81 contain internal bores 98 (see Fig. 7) adapted to movably receive screw 94. The screw is rotated by means of a suitable wrench engaging an outer polygonal portion 99 of the screw. As will be apparent, rotation of the screw serves to displace nut 96 axially of the screw, consequently to adjust motor carrier 91 relative to part 81 in the direction permitted by sliding connection 92-93. Preferably, an indicator dial or wheel 100 is attached to screw 94, and carries indicating markings coacting with a stationary marking or markings 101 on bearing portion 95 of part 91, to indicate the positioning of part 91 relative to part 81. Also, element 97 may have a portion presenting an arcuate outer surface 102 carrying markings coacting with markings on a correspondingly arcuate and adjacent surface 103 of a part 104 carried by vertical slide 62. The relative positioning of these markings on surfaces 102 and 103, which are centered about the rotary axis 88 of part 81, indicates the rotary positioning of the latter element about axis 88. As will be apparent from the later discussion, these markings also serve to indicate the angular positioning of motor 16 and cutter 13 about or with respect to the swarf axis 20.

Motor unit 16 is mounted for movement axially of the motor and cutter relative to carrier 91. This mounting is effected by sliding reception and confinement of a rear dovetail portion 105 of motor unit 16 within a correspondingly shaped undercut recess 106 formed in the forward side of carrier 91. As will be apparent, this sliding movement of motor 16 and cutter 13 is in a direction which extends transversely of the rotary axis 88 of part 81.

Motor unit 16 and the carried cutter are actuated axially by a piston and cylinder mechanism 106, whose cylinder 107 is rigidly attached by legs 108 to the upper end of motor carrier 91, and whose piston rod 109 is rigidly attached to an upper portion 110 of the motor unit. The downward actuation of motor unit 16 and the cutter by piston and cylinder mechanism 106 is limited by a stop member 111, which projects laterally from the upper end of the motor unit, and contains an opening 112 through which there extends a screw 113 rigidly attached by an arm 114 to motor carrier 91. Screw 113 extends parallel to the axis of motor 16, and is of a diameter slightly smaller than the diameter of opening 112, to allow movement of the motor relative to screw 113. The downward actuation of the motor is stopped in a predetermined adjusted position by engagement of arm 111 with a stop element 115 carried by screw 13. This element 115 constitutes a nut which is threadedly carried by screw 113, and may have suitable lugs facilitating its manual adjustment to any desired motor stopping position.

The actuation of piston and cylinder mechanism 106, for axially advancing motor 16, is controlled by a piston and cylinder mechanism 116, which extends vertically alongside the machine, and whose piston 117 is rigidly attached at its lower end 118 to a stationary base or frame member 119 which is fixed relative to main horizontal table supporting guide rails 25. The cylinder 120 of mechanism 116 is vertically movable relative to piston 117. The upper end of cylinder 107 is connected by line 121 to the upper end of cylinder 107, while the lower ends of the two cylinders are interconnected by a line 122. Also, pressure liquid may be supplied to either the upper or lower ends of the cylinders as desired from pump 49, past a pair of valves 123 and 124, and pressure liquid may be discharged from the upper and lower ends of the cylinders to reservoir 50 past a pair of valves 125 and 126.

In normal operation of the apparatus, all of the valves 123 to 126 are closed, so that the upper ends of cylinders 107 and 120 form one closed hydraulic system, while the lower ends of these cylinders form another closed hydraulic system. As a result, vertical movement of cylinder 120 relative to the stationary piston 117 acts through the hydraulic fluid in the cylinders to effect corresponding vertical movement of piston rod 109 and the attached piston relative to cylinder 107. This of course effects vertical movement of motor 16 and cutter 13 in correspondence with the vertical actuation of cylinder 120. The cylinder in turn is actuated by a follower element 127 which engages the upper contoured edge of cam 24, to actuate cylinder 120 vertically in accordance with the axial movement which it is desired to give cutter 13 during a cutting operaton. When the apparatus is inactive, motor 16 and the cutter may be retracted axially upwardly by opening valves 123 and 126, while closing valves 124 and 125, to admit pressure fluid to the lower end of cylinder 107, and discharge pressure fluid from the upper end of that cylinder. These four valves may be subsequently reversed to actuate motor 16 and the cutter axially downwardly when a cutting operation is to be performed, and to a position in which follower 127 engages cam 24. In this position, all of the valves 123 to 126 are of course closed, to allow the previously described cam following operation of the cam system. In instances in which the cutter and motor are to be retained in a single axial position during an entire cutting operation, so that no contoured cam 24 is required for controlling axial displacement of the motor, nut or stop element 115 may be adjusted to a proper position at which it will limit downward actuation of the motor when valves 124 and 125 are open, so that the motor may then be held in that position determined by stop 115 during the cutting operation. It will of course be apparent that a suitable unitary multiple position valve may be substituted for the illustrated individual valves 123 to 126, the latter being represented individually as merely a typical way of controlling the hydraulic system.

Figure 4:
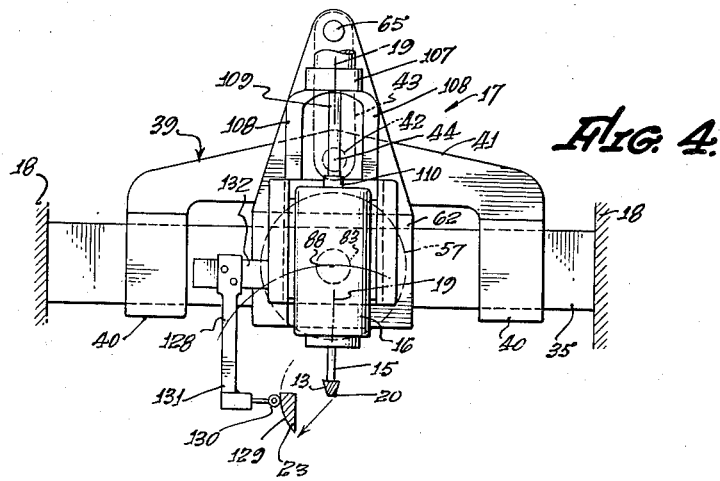
Fig. 4 is a somewhat diagrammatic view of the cutter mounting portion of the apparatus, showing the cutter and motor in directly vertical positions.
Figure 5:
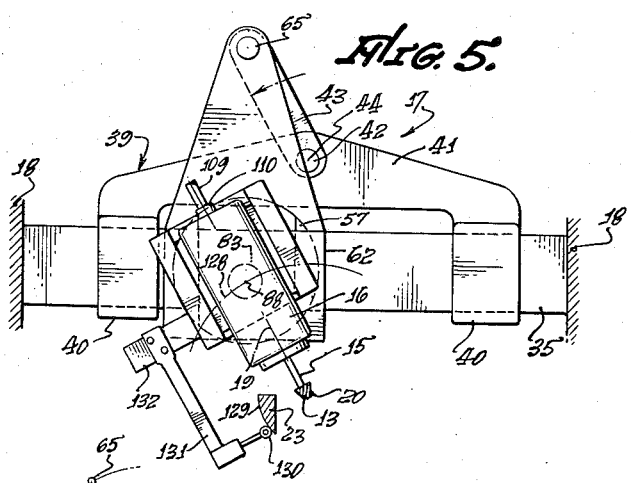
Fig. 5 is a view corresponding to Fig. 4, but showing the cutter and motor deflected to inclined or angular positions.
Figure 6:
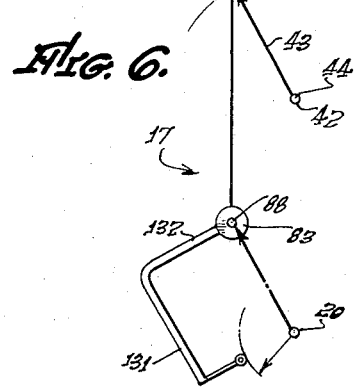
Fig. 6 is a schematic representation of the positioning of certain of the cutter mounting parts in the Fig. 5 condition.

When carriage 55 is moved horizontally along transverse rail 35, as between the two positions represented in Figs. 4 and 5, the corresponding horizontal movement of vertical slide member 62 causes link 43 to swing about axis 44, as to its angular Fig. 5 position. Since parts 62 and 43 are pivotally interconnected at 65, and since element 62 is retained against any type movement except vertical movement relative to carriage 55, the lateral movement of parts 55 and 62 causes the pivotal axis 88 of trunnion member 81 (that is, the axis about which motor 16 and cutter 13 swing), to swing along an arcuate path 128 (Figs. 4 and 5) centered about the swarf axis 20. As best seen in Fig. 6, the axis 88 is spaced directly beneath the axis of pin 65 a distance which is equal to the vertical distance between axis 44 and swarf axis 20. Lateral displacement of carriage 55 causes pin 65 to swing around axis 44 and causes axis 88 to correspondingly swing around swarf axis 20, so that these four axes form in effect a parallelogram type of arrangement, to control the extent of swinging movement of the motor in correspondence with the lateral deflection of carriage 55.

As member 81 and the carried motor and cutter swing about swarf axis 20, these parts are progressively turned about pivotal axis 88 relative to vertical slide 62 in a manner such that the motor and cutter are at all times maintained in a constant predetermined relation to the swarf axis 20, as determined by the positioning of axis 44 about which link 43 turns. More particularly, as will be apparent from Figs. 4 to 6, the motor and cutter are caused to turn about axis 88 in a manner such that the combined movements of the motor and cutter unit along path 128 and about axis 88 produce a bodily swinging movement of the cutter and motor about swarf axis 20. This bodily swinging movement of the cutter results in a very accurate formation of the desired swarf cut on work piece 11.

The described pivotal or rotary movement of members 81 and 91, and the motor and cutter unit, is controlled by the configuration of the elongated contoured cam 23. The cam surface 129 of cam 23 is at all points along its longitudinal extent disposed arcuately about the main swarf axis or mold point 20 at that location, and is engaged by a follower roller 130 which is rotatably mounted in fixed relation to a carrying arm 131 projecting from and rigidly attached to a laterally projecting portion 132 of member 81. Follower 130 is yieldingly urged laterally against cam surface 129 by means of a piston and cylinder mechanism 133, whose cylinder is pivotally attached to bracket 134 which is rigidly attached at 135 to a portion of the stationary base or frame structure 119 which carries table supporting rails 25. The piston of mechanism 133 is pivotally attached at 136 to a lower portion of arm 131 which rotatably carries cam follower 130. As seen in Fig. 8, compressed air from source 72 is applied to the outer end of the cylinder of mechanism 133, to at all times hold follower 136 against surface 129.

Because cam surface 129 is disposed arcuately about the axis 20 about which the pivotal connection of axis 88 swings, the maintenance of follower 130 against this arcuate cam surface 129 serves to maintain part 81 and the actuated elements in proper rotary positions with respect to axis 88 to cause the desired overall bodily swinging movement of motor 16 and cutter 13 about axis 20 (as represented in Figs. 4 and 5). As previously mentioned, any lateral displacement of yoke 39 along carriage 35 acts to correspondingly laterally shift the swarf axis 20 about which trunnion member 81 swings along path 128. Consequently, in the event of such lateral shifting of yoke 39, as controlled by cam 21, the cam face 129 of cam 22 is correspondingly displaced horizontally, to be arcuately disposed about a slightly laterally shifted swarf axis 20. As a result, the follower 130 then acts to assure proper bodily swinging of the motor and cutter about the shifted axis. Thus, the arcuate face 129 of cam 23 is displaced horizontally at any points at which the corresponding portions of cam 21 are designed to laterally shift yoke 39.

In using the illustrated milling machine, the first step is to construct the various cams 21, 22, 23 and 24 in a manner to properly actuate the cutter for producing a desired type of swarf cut. In many instances, less than all of these cams will be required, since the particular swarf cut required may not be of a sufficiently complex nature to necessitate movement of the cutter in all of the possible directions. After the work piece 11 has been rigidly attached to table 10 in some suitable manner, and the various cams 21 to 24 have been properly mounted to the table, the motor 16 may be energized to rapidly rotatively drive cutter 13 about its axis 19. As the table is then moved longitudinally along the supporting rails 25 or other supporting structure, the rapidly turning cutter 13 acts to remove material from the surface 32 of work piece 11, and sometimes also form an upwardly facing surface which may be engaged by the lower end of the cutter. In order that the surface machined may take the form of a swarf cut, the motor 16 and cutter 13 are bodily swung about swarf axis 20 as the table 10 and carried work piece move past the cutter. The swinging movement is controlled in part by transverse shifting movement of carriage 55 along rail 35, as determined by the configuration of the lateral edge of cam 22 which is engaged by cam follower 78. As previously discussed, any deflection of cam follower 78 by cam 22 acts through control valve 74 and piston and cylinder mechanism 73 to correspondingly displace carriage 55 along transverse rail 35. Such lateral shifting movement of carriage 55 causes vertical slide 62 to correspondingly move laterally, and by virtue of its connection to link 43, to simultaneously move downwardly in a manner such that the pivotal connection between parts 62 and 81 swings arcuately along path 128 (Figs. 4 and 5). At the same time, the engagement of follower 130 with arcuate cam surface 129 maintains the motor carrying parts in a relation such that the motor and cutter both bodily swing about swarf axis 20. This, then, produces the desired swarf cut.

If the cut to be made is to be centered about a swarf axis which shifts laterally relative to the work at one or more points along the length of the work, this lateral shifting movement of the swarf axis is produced by horizontal shifting movement of yoke 39 along rail 35, as controlled by cam 21 through valve 51 and piston and cylinder mechanism 45. As previously mentioned, any shifting of the swarf axis by such contouring of cam 21 should be associated with corresponding lateral displacement of the center about which arcuate cam surface 129 of cam 23 is centered. If it is desired that the cutter 13 be displaced axially during the cutting operation, this actuation can be controlled by the shape of cam 24, which acts to vertically displace cylinder 120, to effect corresponding axial displacement of motor 16 and cutter 13 by reason of the closed hydraulic system between cylinders 107 and 120. Thus, the various different types of movement for which the apparatus is designed result in the provision of an extremely flexible swarf cutting machine, which can produce virtually any type of swarf cut which may be desired, and which can do so in a very reliable and precise manner. It is also noted that the cams 21 to 24 are of a nature such that their configuration can be calculated very easily for any particular desired swarf cut.

Fig. 9 represents a slightly variational form of the invention which may be considered identical with the form shown in Figs. 1–8, except as to the substitution of a different cam element 23a for that shown at 23 in Fig. 1. In Fig. 9, the cam 23a is rigidly but removably attached, as by screws 123a, to an arm 140a which projects inwardly and downwardly and then forwardly from, and is fixed relative to, portion 40a of yoke 39a (corresponding to parts 40 and 39 of Fig. 1). Cam 23a is engaged by the same type of follower structure 130a, 131a, etc. as in Fig. 1, and the cam surface of this part 23a is of the same arcuate curvature as in Fig. 5, being centered about swarf axis 20a. The advantage of the Fig. 9 arrangement is, of course, that cam 23a need not be elongated longitudinally of table 10, since the cam does not move with the table.

I claim:

1. A swarf cutting milling machine comprising a table section for holding a work piece, a second section for making a swarf cut on the work piece, and means for moving said table section along a predetermined horizontal path relative to said second section to make a cut, said second section including a guide rail extending generally horizontally above said table section and transversely of said path, a member mounted for sliding movement along said rail transversely of said path, a cam following mechanism for engaging a cam extending along said path and shifting said member along the rail as the table section moves along the path, an element mounted by said member for sliding movement relative thereto in only a predetermined essentially vertical direction, a link pivotally connected to said element at an upper location and extending downwardly from said location, a structure pivotally mounting said link at a lower location and acting through said link to cause bodily swinging movement of said element about a swarf axis extending in the direction of said path in response to said shifting movement of said member, a motor unit for carrying and driving a rotary milling cutter, a connection attaching said motor unit to said element for pivotal movement about a second axis essentially parallel to and offset laterally from said swarf axis, and a cam actuated mechanism operable by a cam extending arcuately about said swarf axis and acting to pivot said motor unit about said second axis relative to said element as the table section advances and as said element swings about said first axis.

2. A swarf cutting milling machine as recited in claim 1, in which said structure mounting said link comprises a saddle part slidable along said rail and having arms engaging the rail at opposite sides of said member, there being a third cam actuated mechanism operable by a cam extending along said path to shift said saddle part along the rail as the table section moves.

3. A swarf cutting milling machine as recited in claim 2, in which said connection mounting the motor unit includes a carrier pivotally mounted to said element, and a double gib connection attaching said motor unit to said carrier for relative sliding movement both axially and transversely of the cutter, there being a piston and cylinder mechanism operable to shift said motor unit axially of the cutter relative to said carrier, and a cam following mechanism for engaging a cam extending along said path and actuating said piston and cylinder mechanism as the table moves.

4. A swarf cutting milling machine comprising a first section for holding a work piece, a second section for making a swarf cut on the work piece, and means for moving one of said sections along a predetermined path relative to the other section to make a cut, said second section including a movable unit holding a rotary power driven milling cutter at a location to engage the work, and means for swinging said unit and cutter about a first axis extending in the direction of said path, said swinging means including a movable mounting structure, said unit being connected to said mounting structure for pivotal movement relative thereto about a second axis during and in accordance with said swinging movement of the unit about said first axis, said second axis being parallel to but laterally offset from said first axis, and an additional part connected to said movable mounting structure for relative pivotal movement about a third axis which is parallel to and laterally offset from said first two axes and in a relation forming with said unit and said movable structure a parallelogram type linkage.

5. A swarf cutting milling machine as recited in claim 4, including means mounting said entire parallelogram type linkage for bodily shifting movement transversely of said path to form a swarf cut about a non-linear axis, and cam actuated means for controlling said bodily shifting movement of the linkage while a cut is being made.

6. A swarf cutting milling machine as recited in claim 4, in which said swinging means include means mounting said additional part to swing about a fourth axis which is parallel to and offset laterally from said first three axes, and is spaced from said first axis a distance corresponding to the spacing between said second and third axes.

7. A swarf cutting milling machine as recited in claim 4, in which said swinging means include a cam following mechanism for pivoting said unit about said second axis relative to said movable mounting structure as said one section advances along said path, and a cam for actuating said cam following mechanism and having a cam surface extending arcuately about said first axis and in the direction of said path in a relation causing said unit to swing about said first axis.

8. A swarf cutting milling machine as recited in claim 4, in which said movable unit includes a carrier pivotally attached to said movable mounting structure for relative pivotal movement about said second axis, and includes a relatively shiftable structure for holding said rotary cutter, and also includes cam controlled means for actuating said shiftable cutter holding structure axially of the cutter relative to said carrier during movement of said one section along said path.

9. A swarf cutting milling machine as recited in claim 4, in which said means for swinging said unit about said first axis include a supporting guide extending generally transversely of said path, a slide member mounted to and guided by said guide for sliding movement in a first direction transversely of said path, and a connection mounting said movable mounting structure to said slide member for guided sliding movement relative thereto in a second transverse direction.

10. A swarf cutting milling machine as recited in claim 4, in which said means for swinging said unit about said first axis include a supporting guide extending generally transversely of said path, a slide member mounted to and guided by said guide for sliding movement in a first direction transversely of said path, a connection mounting said movable mounting structure to said slide member for guided sliding movement relative thereto in a second transverse direction which extends from said second axis to the third axis, a cam following mechanism for pivoting said unit about said second axis relative to said movable mounting structure as said one section advances along said path, a cam for actuating said cam following mechanism and having a cam surface extending arcuately about said first axis and in the direction of said path in a relation causing said unit to swing about said first axis, and means mounting said additional part to swing about a fourth axis which is parallel to and offset laterally from said first three axes, and is spaced from said first axis a distance corresponding to the spacing between said second and third axes.

References Cited in the file of this patent

UNITED STATES PATENTS

| | | |
|---|---|---|
| 731,533 | Barr | June 23, 1903 |
| 2,341,194 | Schwartz et al. | Feb. 8, 1944 |
| 2,660,930 | De Vlieg et al. | Dec. 1, 1953 |
| 2,675,743 | Martellotti et al. | Apr. 20, 1954 |
| 2,753,244 | Dubosclard | July 3, 1956 |
| 2,793,568 | Martellotti et al. | May 28, 1957 |